US011260838B2

(12) United States Patent
Kanagarajan et al.

(10) Patent No.: US 11,260,838 B2
(45) Date of Patent: Mar. 1, 2022

(54) METHODS AND SYSTEMS FOR VEHICLE CONTACT PREDICTION AND AUTO BRAKE ACTIVATION

(71) Applicant: Honeywell International Inc., Morris Plains, NJ (US)

(72) Inventors: Sivakumar Kanagarajan, TamilNadu (IN); Dinkar Mylaraswamy, Fridley, MN (US); Ranga Udipi, Karnataka (IN)

(73) Assignee: Honeywell International Inc., Charlotte, NC (US)

( * ) Notice: Subject to any disclaimer, the term of this patent is extended or adjusted under 35 U.S.C. 154(b) by 237 days.

(21) Appl. No.: 16/009,852

(22) Filed: Jun. 15, 2018

(65) Prior Publication Data
US 2019/0381977 A1   Dec. 19, 2019

(51) Int. Cl.
*B60T 8/171* (2006.01)
*B60T 8/17* (2006.01)
*B60T 7/22* (2006.01)
*G06N 7/00* (2006.01)

(52) U.S. Cl.
CPC .............. *B60T 8/171* (2013.01); *B60T 7/22* (2013.01); *B60T 8/1703* (2013.01); *G06N 7/005* (2013.01)

(58) Field of Classification Search
CPC ...... G08G 5/065; G08G 5/0021; G08G 5/045; G08G 5/04; G08G 5/0008; G08G 5/0078; G08G 1/04; G08G 1/091
See application file for complete search history.

(56) References Cited

U.S. PATENT DOCUMENTS

| 4,293,857 | A | * | 10/1981 | Baldwin | G01S 13/933 342/32 |
| 5,978,725 | A | * | 11/1999 | Kagawa | B60T 7/12 303/122.06 |
| 6,118,401 | A | * | 9/2000 | Tognazzini | G01S 7/04 342/29 |
| 8,457,812 | B2 | * | 6/2013 | Zammit-Mangion | G08G 5/065 701/15 |
| 8,694,237 | B1 | * | 4/2014 | Romine, III | G08G 5/0078 701/301 |

(Continued)

OTHER PUBLICATIONS

Lacey, "WingWatch: Aircraft Ground Collision Avoidance System," Computer Science and Statistics, retrieved from https://www.scss.tcd.ie/Gerard.Lacey/Gerard_Lacey_Homepage/WingWatch_files/WingWatch%20Overview.pdf on Jun. 15, 2018, 11 pages.

*Primary Examiner* — Redhwan K Mawari
(74) *Attorney, Agent, or Firm* — Shumaker & Sieffert, P.A.

(57) ABSTRACT

Systems and methods are disclosed for predicting a hot spot. One method comprises receiving, by a hot spot prediction system, vehicle characteristics associated with a vehicle and traffic data. Then the hot spot prediction system determines a hot spot and an estimated arrival time at the hot spot based on the vehicle characteristics and the traffic data. Following the determination, an auto brake application system receives the hot spot and the estimated arrival time and determines a safe stop time based on the vehicle characteristics, the hot spot and the estimated arrival time. The auto brake application system then sends a notification to the vehicle based on determining that the vehicle can stop within the safe stop time, and performs an action in response to receiving a confirmation from the vehicle.

20 Claims, 7 Drawing Sheets

(56) References Cited

U.S. PATENT DOCUMENTS

| | | | | |
|---|---|---|---|---|
| 9,047,771 B1* | 6/2015 | Thoreen | | G01C 23/00 |
| 9,997,080 B1* | 6/2018 | Chambers | | G08G 5/0034 |
| 10,328,805 B1* | 6/2019 | Wyrobek | | B60L 58/12 |
| 2008/0249675 A1* | 10/2008 | Goodman | | B64C 25/426 |
| | | | | 701/16 |
| 2010/0060511 A1* | 3/2010 | Nouvel | | G01C 23/00 |
| | | | | 342/29 |
| 2011/0074607 A1* | 3/2011 | Khatwa | | G08G 5/0008 |
| | | | | 340/947 |
| 2011/0231096 A1* | 9/2011 | Ridenour, II | | G08G 5/0008 |
| | | | | 701/301 |
| 2013/0110323 A1* | 5/2013 | Knight | | G05D 1/0083 |
| | | | | 701/3 |
| 2013/0110388 A1* | 5/2013 | Becher | | G08G 5/02 |
| | | | | 701/120 |
| 2013/0166134 A1* | 6/2013 | Shitamoto | | G05D 1/024 |
| | | | | 701/26 |
| 2013/0321169 A1 | 12/2013 | Bateman et al. | | |
| 2013/0321176 A1* | 12/2013 | Vasek | | G01S 13/93 |
| | | | | 340/945 |
| 2014/0142838 A1* | 5/2014 | Durand | | G08G 5/045 |
| | | | | 701/301 |
| 2014/0195077 A1* | 7/2014 | Johnsen | | B64D 45/04 |
| | | | | 701/16 |
| 2014/0339372 A1* | 11/2014 | Dekel | | B64C 29/00 |
| | | | | 244/7 R |
| 2015/0081292 A1* | 3/2015 | Populus | | G08G 5/0095 |
| | | | | 704/235 |
| 2015/0232090 A1* | 8/2015 | Jeon | | B60W 10/18 |
| | | | | 701/41 |
| 2016/0071422 A1 | 3/2016 | Bazawada et al. | | |
| 2016/0083111 A1* | 3/2016 | O'Dell | | G06K 9/00624 |
| | | | | 348/144 |
| 2016/0140855 A1* | 5/2016 | Gannon | | G08G 5/0021 |
| | | | | 701/533 |
| 2016/0171898 A1* | 6/2016 | Silver | | G08G 5/0078 |
| | | | | 701/3 |
| 2016/0355179 A1* | 12/2016 | Cannella | | B60Q 9/008 |
| 2016/0363935 A1* | 12/2016 | Shuster | | G08G 1/163 |
| 2018/0061243 A1* | 3/2018 | Shloosh | | G08G 5/0091 |
| 2018/0211543 A1* | 7/2018 | Wei | | G06Q 10/0833 |
| 2018/0362032 A1* | 12/2018 | Yang | | B60W 30/0956 |
| 2019/0146520 A1* | 5/2019 | Naithani | | G05D 1/0246 |
| | | | | 701/28 |
| 2019/0381977 A1* | 12/2019 | Kanagarajan | | B60T 8/1703 |
| 2020/0369384 A1* | 11/2020 | Kelly | | G05D 1/106 |
| 2021/0116944 A1* | 4/2021 | Hu | | B64C 39/024 |

\* cited by examiner

METHODS AND SYSTEMS FOR VEHICLE CONTACT PREDICTION AND AUTO BRAKE ACTIVATION

TECHNICAL FIELD

The present disclosure relates to methods and systems for a computer-implemented method of anticipating and avoiding vehicle collisions. More particularly, the present disclosure relates to methods and systems for vehicle contact prediction and auto brake activation.

BACKGROUND

Aircraft wingtip collisions have become a key concern in the aviation industry as airport terminal utilization by airlines and consumers grows. Airports may experience operational disruptions when one or more aircrafts are involved in a collision. Further, airframe damage may result in a significant loss for airlines in terms of repair cost and time.

Various hardware deployment solutions and/or aircraft-based solutions have been proposed (e.g., wingtip radars coupled with image processing systems) to address this concern. However, most of the aircraft-based solutions rely on radar visibility to detect and prevent wingtip collisions, requiring hardware installations on aircrafts. Further, imaging-based technology may not be effective under poor visibility due to natural causes and/or non-detectable objects (e.g., non-radiating (i.e., RAM coated) objects). Furthermore, most of the proposed and current solutions are capable of detection only, requiring aircraft crew to take action in response to a notification or an alert.

Therefore, there is a need for a comprehensive, airport-centric solution leveraging existing technology and infrastructure of the airports, providing a cost effective hot spot detection and post-detection guidance system.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

Further, while the background description was provided in the context of an aircraft and an airport, it would be obvious to one of ordinary skill in the pertinent art that the same need may exist in other contexts, including but not limited to a traffic involving motor vehicles (e.g., motorcycles, cars, trucks, buses, etc.), railed vehicles (e.g., trains, trams, subways, etc.), watercraft (e.g., ships, boats, yachts, etc.), spacecraft, and any other vehicles or moving machines. Therefore, the exemplary embodiment of the current disclosure may not be limited to aircraft/airport deployment, but may also be integrated with other machines, systems, components, or any other environment or context in which the aforementioned need may exist.

SUMMARY OF THE INVENTION

One embodiment provides a computer implemented method for predicting a hot spot, the method comprising: receiving, by a hot spot prediction system, vehicle characteristics associated with a vehicle and traffic data; determining, by the hot spot prediction system, a hot spot and an estimated arrival time at the hot spot based on the vehicle characteristics and the traffic data; receiving, by an auto brake application system, the hot spot and the estimated arrival time; determining, by the auto brake application system, a safe stop time based on the vehicle characteristics, the hot spot and the estimated arrival time; sending, by the auto brake application system, a notification to the vehicle based on determining that the vehicle can stop within the safe stop time; and performing, by the auto brake application system, an action in response to receiving a confirmation from the vehicle.

One embodiment provides a system for predicting a hot spot. The system may comprise a hot spot prediction system comprising one or more processors configured to receive vehicle characteristics associated with a vehicle and traffic data; and determine a hot spot and an estimated arrival time at the hot spot based on the vehicle characteristics and the traffic data; and an auto brake application system comprising one or more processors configured to receive the hot spot and the estimated arrival time; determine a safe stop time based on the vehicle characteristics, the hot spot and the estimated arrival time; send a notification to the vehicle based on determining that the vehicle can stop within the safe stop time; and perform an action in response to receiving a confirmation from the vehicle.

One embodiment provides a non-transitory computer readable medium for predicting a hot spot. The non-transitory computer readable medium may store instructions that, when executed by one or more processors, cause the one or more processors to perform a method comprising: receiving, by a hot spot prediction system, vehicle characteristics associated with a vehicle and traffic data; determining, by the hot spot prediction system, a hot spot and an estimated arrival time at the hot spot based on the vehicle characteristics and the traffic data; receiving, by an auto brake application system, the hot spot and the estimated arrival time; determining, by the auto brake application system, a safe stop time based on the vehicle characteristics, the hot spot and the estimated arrival time; sending, by the auto brake application system, a notification to the vehicle based on determining that the vehicle can stop within the safe stop time; and performing, by the auto brake application system, an action in response to receiving a confirmation from the vehicle.

BRIEF DESCRIPTION OF THE DRAWINGS

Embodiments of the invention will now be described, by way of example only, with reference to the accompanying drawings in which.

DETAILED DESCRIPTION

Figure 1A:
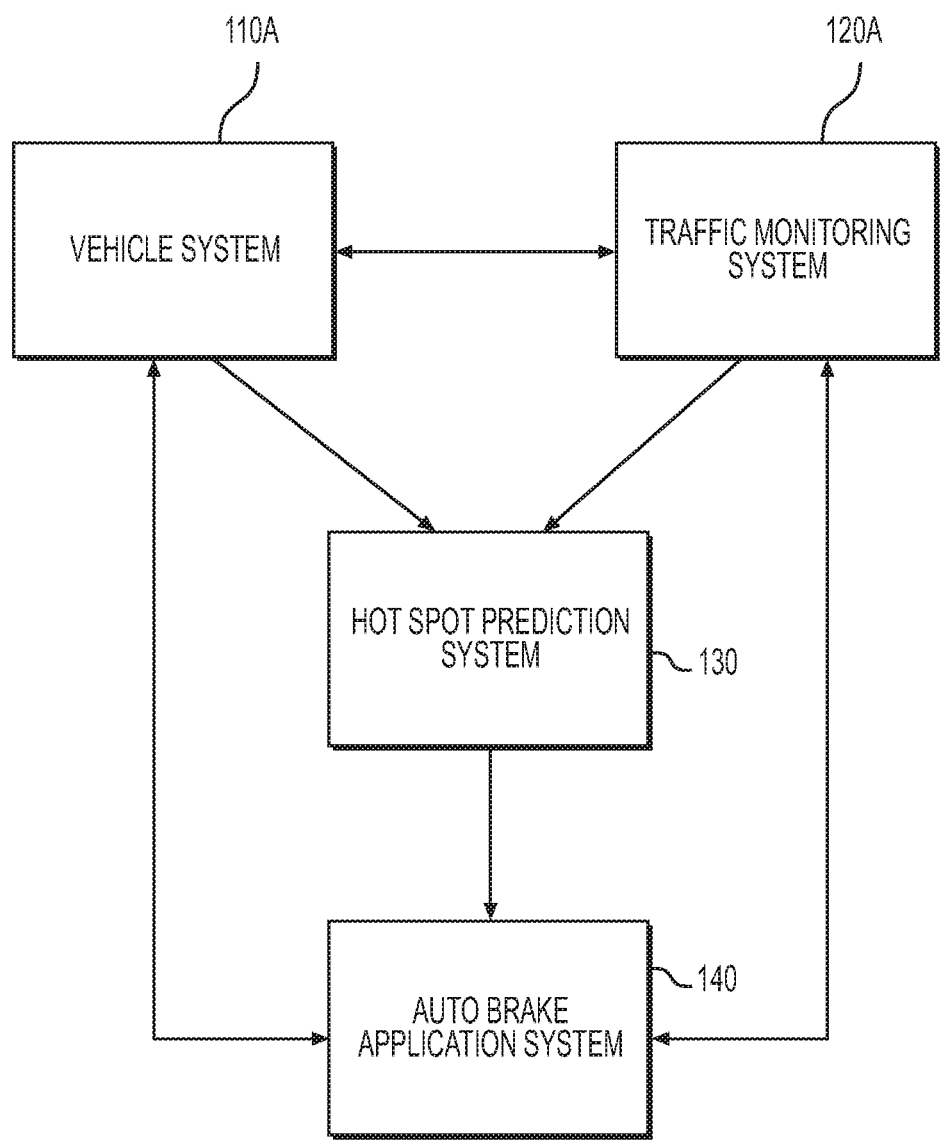
FIG. 1A shows an exemplary embodiment of a collision avoidance system.

The following embodiments describe systems and methods for hot spot prediction and auto brake activation.

The disclosed embodiment may utilize information used/given by air traffic controller (ATC) for surface guidance to detect and avoid wingtip collisions. Aircraft movement trends may be predicted based on the position and speed of the aircraft on a surface. A volumetric region (i.e., safety envelope) may be allotted to the aircraft and the temporal displacements thereof may be predicted as time progresses. Volumetric regions may also be allotted to objects of interest on surfaces (moving objects (e.g., other aircrafts/vehicles, etc.), static objects (buildings, etc.)) and movement trends of the moving objects of interest may also be predicted.

Based on the collected information, hot spots (e.g., points of possible collision) may be projected and transmitted to the aircrafts of interest. The projected hot spots may be visually presented to the crew in real-time. Various types of alerts may be provided to the crew (e.g., visual, audible, haptic, etc.) so that the vehicle can be maneuvered carefully at the hotspots. Further, auto brake setting may be activated upon hot spot detection.

The disclosed embodiment makes use of existing infrastructure of the airport to detect and avoid wingtip collisions, mainly based on clearances data provided/maintained by the ATC. Thus, the disclosed embodiment may not necessitate special aircraft installations.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Figure 1B:
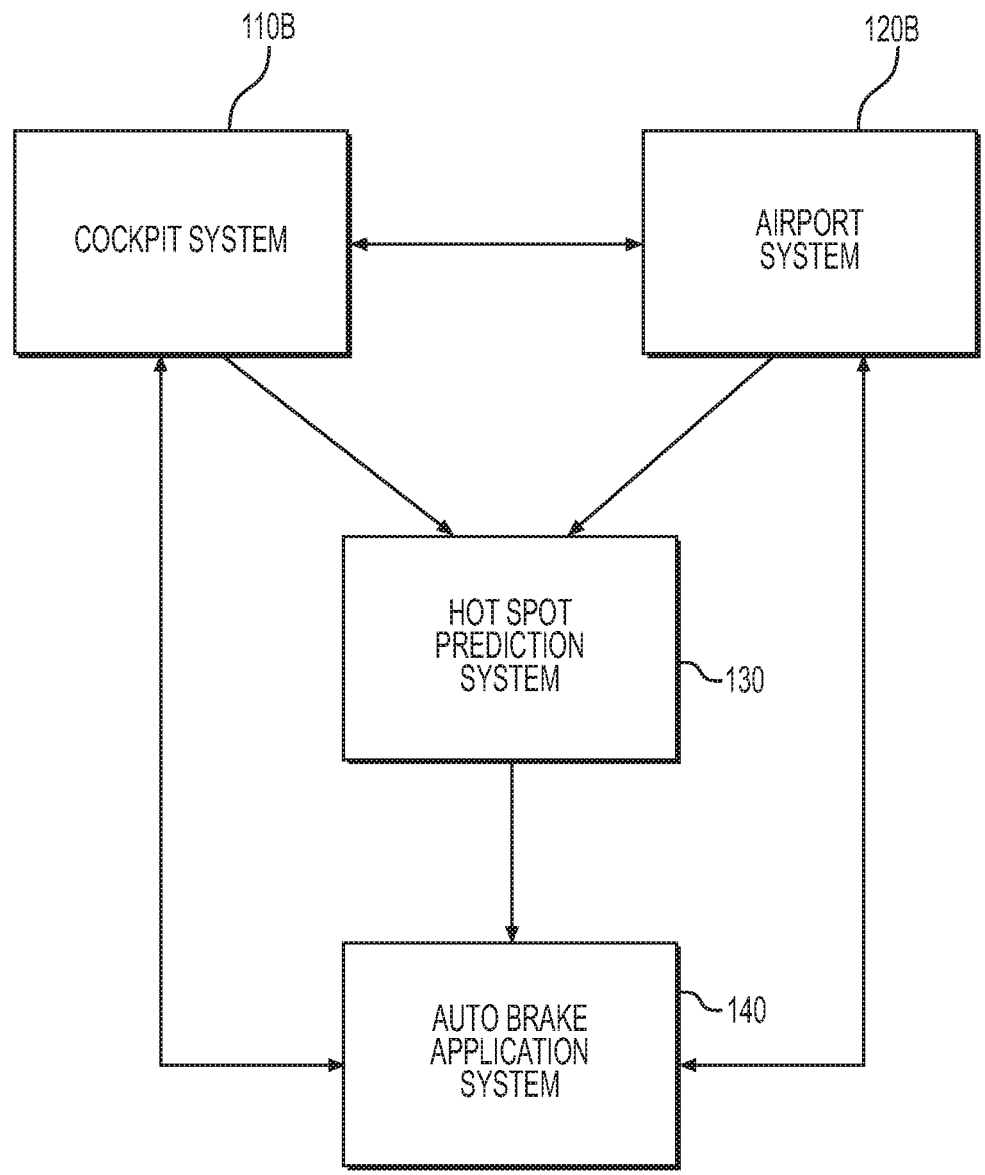
FIG. 1B shows an exemplary embodiment of the collision avoidance system implemented in an airport.

Referring now to the appended drawings, FIG. 1A shows an exemplary embodiment of a collision avoidance system. In general, FIG. 1A depicts a vehicle system 110A, a traffic monitoring system 120A, a hot spot prediction system 130, and an auto brake application system 140. FIG. 1B shows an exemplary embodiment of the collision avoidance system implemented in an airport. In general, FIG. 1B depicts a cockpit system 110B, an airport system 120B, a hot spot prediction system 130, and an auto brake application system 140. In the discussion below, reference will be made to both FIG. 1A and FIG. 1B.

In FIG. 1A, vehicle system 110A may be an on-board, computer-implemented display and control system that displays data related to vehicle operation via electronic displays and receives operator-provided inputs to manage and control various vehicle operation functions. Vehicle system 110A may comprise or be in communication with a vehicle management system (not shown), which may be a specialized, embedded on-board computer system that drives display of data on the vehicle system 110A and that automates various navigation and vehicle performance-related tasks, including but not limited to data calculations, data aggregation, data comparison, data storage, data transmission, data query and retrieval, and data display. To perform these tasks, the vehicle management system may collect data from various sensors on the vehicle as well as from other components and systems implemented on and off the vehicle. Thus, the vehicle management system may collect and store various real-time vehicle characteristics and enable vehicle system 110A to control and display the vehicle characteristics. Vehicle system 110A may also be in communication with traffic monitoring system 120A, provide real-time vehicle characteristics and other vehicle-related data to the traffic monitoring system 120A, and in response, receive traffic control-related data including instructions, commands, and clearances from the traffic monitoring system 120A. The vehicle system 110A may be used for any type of manned or unmanned vehicle that can be manually and/or automatically maneuvered, including but not limited to aircrafts, cars, boats, motorcycles, bicycles, helicopters, and spaceships. For example, cockpit system 110B shown in FIG. 1B is a type of vehicle system 110A that may be used in aircrafts. Cockpit system 110B may comprise or be in communication with a flight management system (not shown), which is a type of vehicle management system discussed above that may be used on aircrafts.

Traffic monitoring system 120A may be configured to monitor vehicles located within a monitoring range (e.g., within a specific area) and perform traffic control-related tasks. For instance, traffic monitoring system 120A may be configured to monitor vehicle locations and vehicle movements to control traffic within a specific area. The traffic control function may be accomplished by communicating, to a vehicle (e.g., to vehicle system 110A), locations and movements of other vehicles within the specific area, and communicating directives as to whether to enter, stop, move, maintain speed, accelerate, decelerate, detour, or any other instructions which may help maintain traffic flow and safety within the specific area (e.g., commands, clearances, etc.). The communicated information may be automatically determined by one or more computers implemented on the traffic monitoring system 120A or alternatively, may be manually determined by a human operator of the traffic monitoring system 120A. The communicated information may also be logged in communication log(s) or transcript(s). The traffic monitoring system 120A may be equipped with a database in which various vehicle and traffic-related information are stored, such as vehicle identification information, vehicle location information, traffic information, vehicle movement information, map information, route information, vehicle arrival/departure schedule information, clearances, communication log, communication transcripts, etc.

As alluded to above, the traffic monitoring system 120A may also be used for a traffic environment involving any type of manned or unmanned vehicle that can be manually and/or automatically maneuvered, including but not limited to aircrafts, cars, boats, motorcycles, bicycles, helicopters, and spaceships. For example, airport system 120B shown in FIG. 1B is a type of traffic monitoring system 120A that may be used in airports. Airport system 120B may be configured to monitor aircrafts located within a monitoring range (both grounded and airborne) and perform aircraft traffic-control related tasks. Data generated and stored by the airport system 120B may include, but is not limited to, location and movement data, clearances issued by air traffic controller, aircraft identifiers and characteristics, arrival/departure schedule, airport/aerodrome map data, air traffic data, on-ground traffic data, existing hotspots, communication logs and transcripts, etc. Various data may be stored in a centralized storage of the airport system 120B, or may be stored separately in the systems or devices used to generate or capture the respective data (e.g., automatic dependent surveillance—broadcast (ADS-B), air-traffic controller (ATC), advanced-surface movement guidance and control system (A-SMGCS), augmented position systems, visual docking stations, navigation database, other ground guidance systems, etc.).

Hot spot prediction system 130 may be configured to receive data from the vehicle system 110A (e.g., cockpit system 110B) and the traffic monitoring system 120A (e.g., airport system 120B), and based on the received data, determine hot spot(s) along the vehicle's planned route, a distance to the hot spot(s), and an estimated arrival time at the hot spot(s). Throughout this disclosure, the term "hot spot" may mean any location or specific area with a history or potential for risk of vehicle collision, contact, or other incursion, and where, in some cases, heightened attention by vehicle operators is important to avoid collision, contact, or other incursion. The term "hot spot" may alternatively or additionally be used herein to refer to either a location of vehicle contact, or the timing, event of, or objects involved in, vehicle contact. The manner in which the hot spot, the distance, and the estimated arrival time are determined by the hot spot prediction system 130 will be discussed in detail in the following sections.

Auto brake application system 140 may be configured to receive data from the hot spot prediction system 130 to determine a safe stop time to the hot spot and activate an auto brake with or without a vehicle operator's confirmation. Auto brake application system 140 may also be configured to receive some data directly from the vehicle system 110A (e.g., cockpit system 110B) and/or the traffic monitoring system 120A (e.g., airport system 120B), such as real-time vehicle characteristics, vehicle location/position data, map information, etc., in order to calculate the safe stop time to the predicted hot spot. The manner in which the safe stop time may be determined and the auto brake engaged by the auto brake application system 140 will be discussed in detail in the following sections.

In the following sections, the methods and systems for avoiding vehicle collision will be discussed with specificity to aircrafts and airports (i.e., aerodrome). However, as alluded to above, the embodiments of the current disclosure are not restricted for use with aircrafts/airports only, and may be used in any environment where a need exists for predicting hot spots and avoiding vehicle condition. For instance, the current embodiments may be used in an environment involving any type of manned or unmanned vehicle that can be manually and/or automatically maneuvered, including but not limited to aircrafts, cars, boats, motorcycles, bicycles, helicopters, and spaceships.

Figure 2:
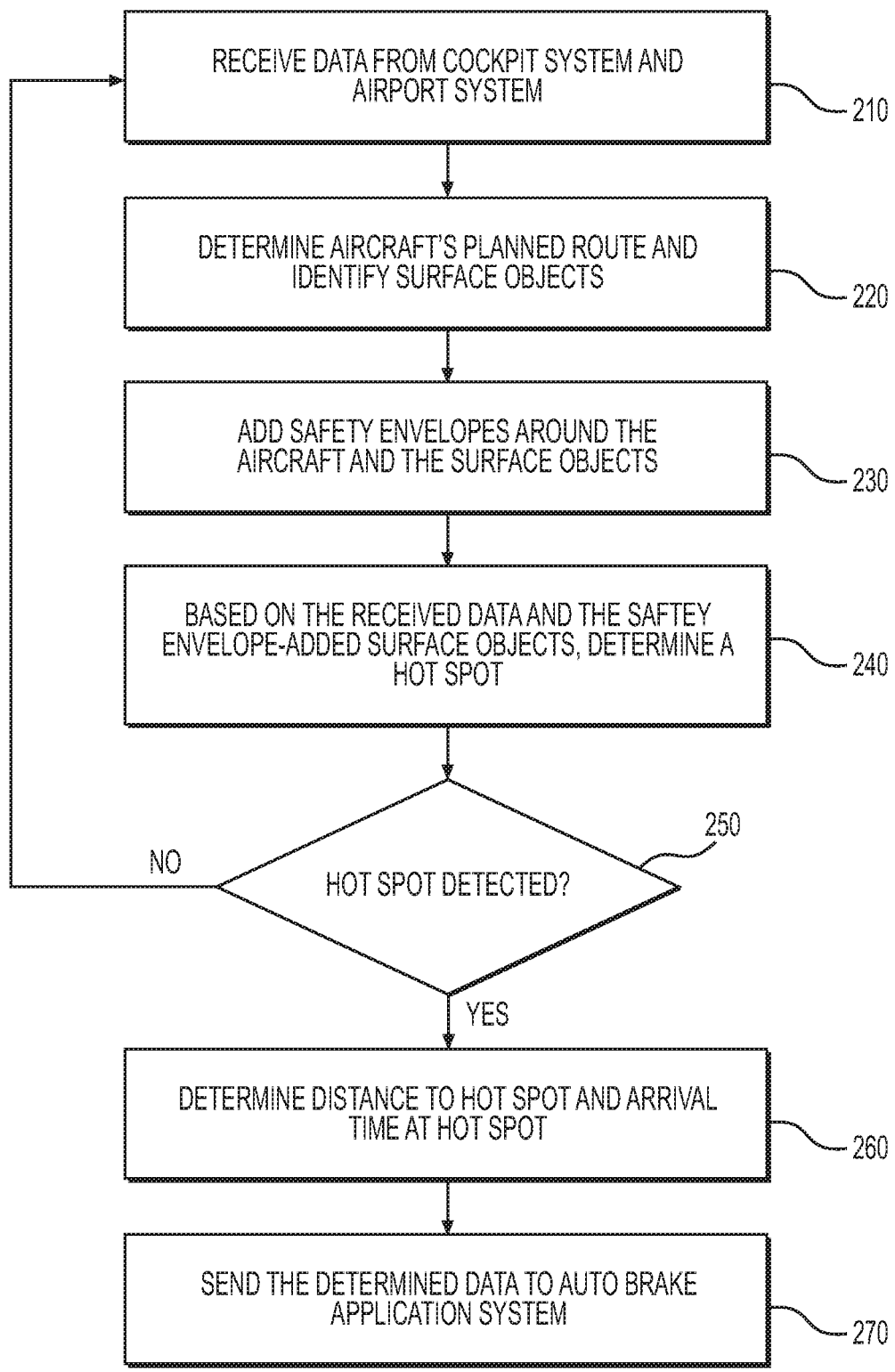
FIG. 2 is a flowchart illustrating an exemplary method of predicting a hot spot of the current disclosure.
Figure 3:
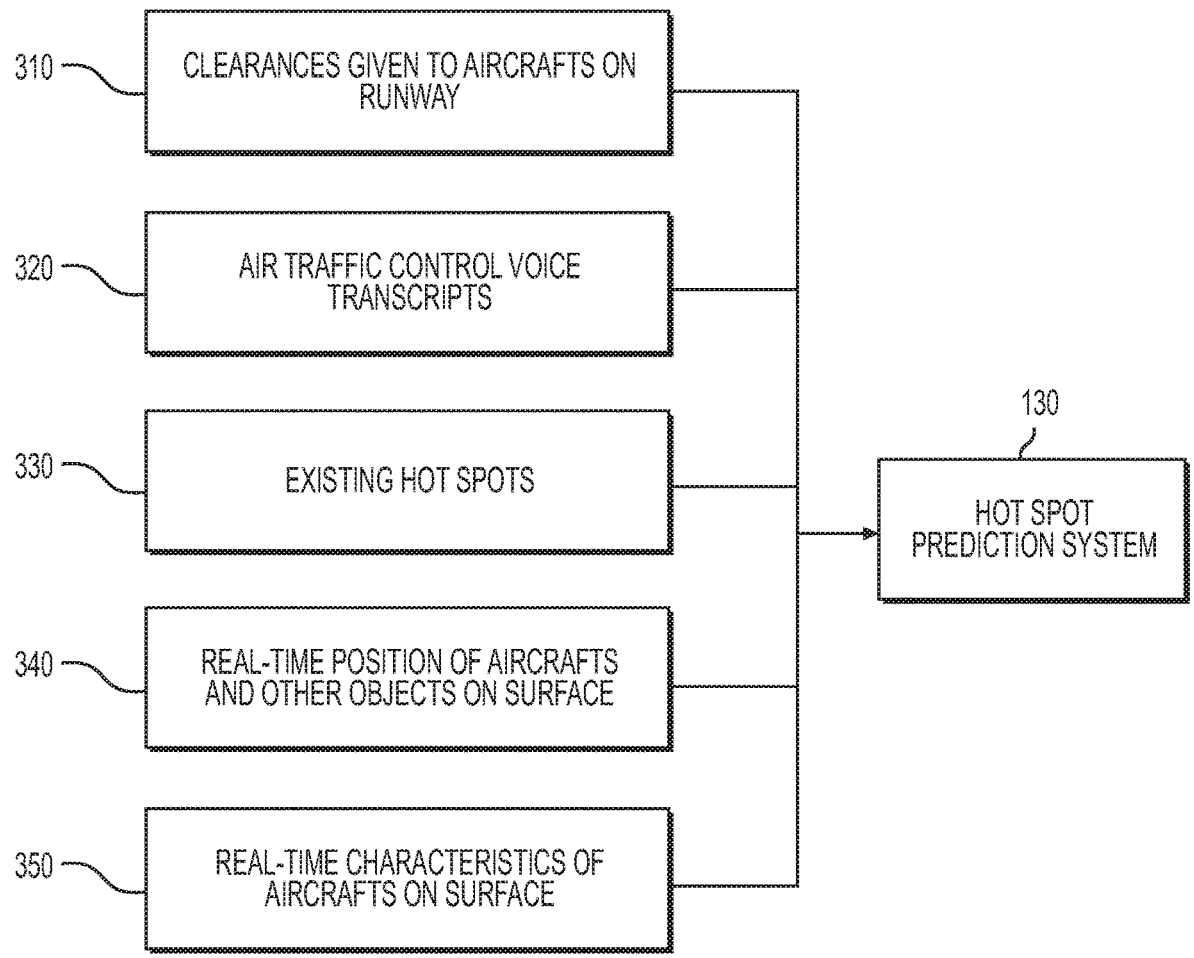
FIG. 3 illustrates different types of data that may be received by a hot spot prediction system.

FIG. 2 is a flowchart illustrating an exemplary method of predicting a hot spot of the current disclosure. In particular, the exemplary method illustrated in FIG. 2 may be performed by the hot spot prediction system 130. At step 210, the hot spot prediction system 130 may receive data from the cockpit system 110B and the airport system 120B. FIG. 3 shows the types of exemplary data that may be received at the hot spot prediction system 130. The received data may include the following types of data:

Clearances given to aircrafts on runway (data 310), received from an ATC or navigation database (Nav DB) of the airport system 120B, and/or from the cockpit system 110B;

ATC voice transcripts (data 320), received from an ATC of the airport system 120B and/or from the cockpit system 110B;

Existing hot spots (data 330), received from an airport database of the airport system 120B;

Real-time position of aircrafts and other objects on surface (data 340), received from automatic dependent surveillance—broadcast (ADS-B), augmented position systems, visual docking stations, ATC radar, airport/aerodrome map, and other ground guidance systems of the airport system 120B; and Real-time characteristics (e.g., speed, weight, momentum, etc.) of aircrafts and other objects on surface (data 350), received from the airport system 120B and/or the cockpit system 1106.

Continuing with FIG. 2, at step 220, the hot spot prediction system 130 may determine the aircraft's planned route along the runway and/or the taxiway using the data received from the cockpit system 1106 and the airport system 120B (e.g., clearances, navigation data, ATC voice transcripts, real-time position of the aircraft, etc.). Further, the hot spot prediction system 130 may also identify surface objects along the aircraft's planned route, using the data received from the airport system 120B (e.g., airport/aerodrome map, clearances, real-time position of objects on surface, etc.). The identified surface objects may be static (e.g., buildings, stationary equipment, etc.) or dynamic (e.g., other aircrafts, unmanned aerial vehicles, cars/trucks, shuttles, etc. that are moving).

At step 230, the hot spot prediction system 130 may add safety envelopes around the aircraft and other identified surface objects. The addition of the safety envelopes effectively enlarges the volume of the aircraft as well as those of the identified surface objects for the purpose of calculating hot spot-related parameters (e.g., distance to hot spot, estimated time of arrival at hot spot, safe stop time, etc., which will be discussed in detail in the following sections). This may prevent overestimation of the hot spot-related parameters (e.g., distance to the hot spot calculated to be longer than the actual distance, estimated time of arrival at hot spot calculated to be later than the actual time of arrival, safe stop time calculated to be longer than the actual stop time, etc.), which could result in missed notifications/alerts, possibly leading to a collision. Also, by adding the safety envelopes, the hot spot-related parameters calculated based on the enlarged volumes of the aircraft and the identified surface objects may enable performance of corrective or preventative actions more quickly than the case under which no safety envelopes are added.

At step 240, the hot spot prediction system 130 may determine a hot spot along the aircraft's planned route, based on the data received from the cockpit system 1108 and the airport system 120B. In determining a hot spot, the hot spot prediction system 130 may first identify one or more potential hot spots along the aircraft's planned route using the received clearances data and/or existing (i.e., historical) hot spots data. In some embodiments, additional data such as real-time aircraft position data, real-time surface objects position data, real-time aircraft characteristics, and/or real-time surface object characteristics may also be used. The locations of the one or more potential hot spots may be determined using the data received from the airport system 120B, such as existing hot spots data, real-time surface object position data, real-time surface object characteristics, and/or airport/aerodrome map.

In determining the one or more potential hot spots, the hot spot prediction system 130 may calculate a probability of collision with the aircraft for each of the determined potential hot spots, using the data received from the cockpit system 110B and/or the airport system 120B (e.g., clearances, real-time positions/characteristics of aircrafts and other identified surface objects, etc.). Probability of collision for a hot spot may represent a probability that the safe envelope-added aircraft collides with a safe envelope-added surface object at or around the hot spot. In one embodiment, the hot spot prediction system 130 may then determine a hot spot with the highest probability of collision with the aircraft. In another embodiment, the hot spot prediction system 130 may determine one or more hot spots having a probability of collision above a predefined threshold. In another embodiment, the hot spot prediction system 130 may determine a hot spot that the aircraft will arrive at first. In yet another embodiment, the hot spot prediction system 130 may determine a hot spot that the aircraft will arrive at first and that has a probability of collision above a predefined threshold. Data analysis/computations may not be limited to the foregoing discussions and in some embodiments, other analysis/computations involving other variables may be performed to predict hot spots along the aircraft's route.

At step 250, if it is determined that a hot spot is not detected, the method may loop back to step 210 and the hot spot prediction system 130 may continue to analyze the data received from cockpit system 1106 and the airport system 1206 to detect a hot spot, iteratively performing steps 210-250 until a hot spot is detected. If it is determined that a hot spot is detected at step 250, the method may proceed to step 260 where the hot spot prediction system 130 determines a distance to the hot spot and an estimated arrival time at the hot spot, using the real-time aircraft position data, real-time surface object position data, hot spot location data, airport/aerodrome map, real-time aircraft characteristics data, and/or real-time subject object characteristics data.

Also, the distance to the hot spot and the estimated arrival time at the hot spot may be determined by taking into account the safety envelope added to the aircraft and/or the surface object(s) of interest (e.g., calculated based on the enlarged volume of the aircraft and/or the surface object(s) of interest). Once the distance to the hot spot and the estimated arrival time at the hot spot are determined at step 260, the hot spot data including the location data, the distance to the hot spot, and the estimated arrival time at the hot spot are sent to auto brake application system 140. In some embodiments, the real-time aircraft position and characteristics data may also be sent from the hot spot prediction system 130 to the auto brake application system 140.

In some embodiments, in addition to sending the hot spot data to the auto brake application system 140, the hot spot prediction system 130 may send the hot spot data with real-time alerts to the cockpit system 110b as well as other airport guidance systems within the airport system 120B (e.g., advanced-surface movement guidance and control system (A-SMGCS), visual guidance system (VGS), etc.), mobile devices used by airport personnel and/or aircraft crew, etc. The hot spot data with the real-time alerts may be presented to the crew (e.g., pilot) and/or other airport personnel via a display (e.g., FIG. 6) or as audible/haptic notifications/alerts.

It is noted that the various data used by the hot spot prediction system 130 to determine the hot spot(s) and the related parameters (e.g., distance to the hot spot, estimated arrival time at the hot spot, etc.) may be collected from systems and devices already implemented in the existing infrastructure of the airports. Therefore, the hot spot prediction system 130 of the present disclosure is cost effective in that new hardware installations (e.g., radar, sensors, lenses, devices, etc.) may not be required.

Figure 4:
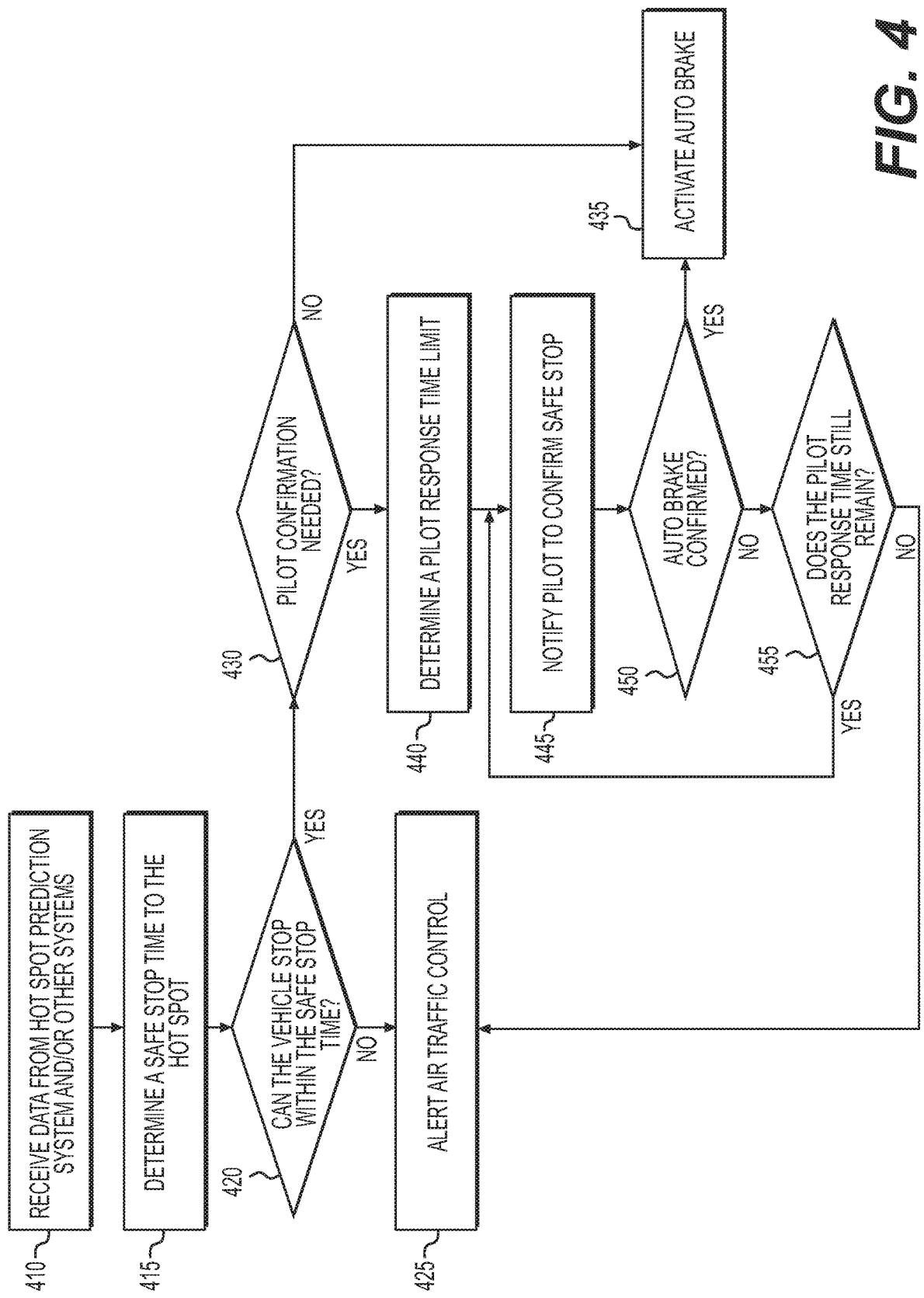
FIG. 4 is a flowchart illustrating an exemplary method of activating an auto brake of the current disclosure.
Figure 5:
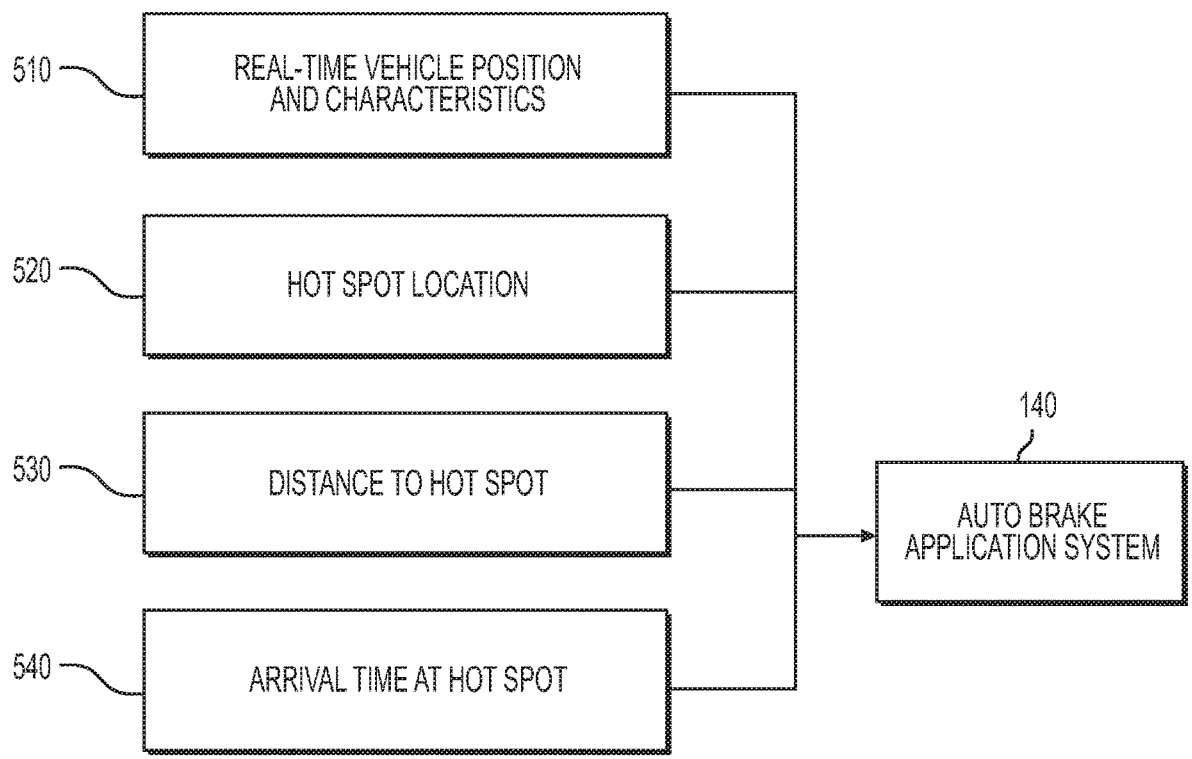
FIG. 5 illustrates different types of data that may be received by an auto brake application system.

FIG. 4 is a flowchart illustrating an exemplary method of activating an auto brake of the current disclosure. In particular, the exemplary method illustrated in FIG. 4 may be performed by the auto brake application system 140. At step 410, the auto brake application system 140 may receive the determined data (e.g., predicted hot spot, distance to the hot spot, estimated arrival time at the hot spot) from the hot spot prediction system 120. In some embodiments, the auto brake application system 140 may also receive data directly from the cockpit system 110B and/or the airport system 120B, such as real-time aircraft position and characteristics. In some embodiments, data such as real-time aircraft position and characteristics may be received from the hot spot prediction system 120, which has already stored such data for determining the hot spot, distance to the hot spot, and estimated arrival time at the hot spot at steps 240, 250, and 260 of FIG. 2. FIG. 5 shows the types of exemplary data that may be received at the auto brake application system 140. The received data may include the following types of data:

Real-time vehicle position and characteristics (data 510) (e.g., speed, weight, momentum, etc.), received from the hot spot prediction system 130, the airport system 120B (e.g., ADS-B, augmented position systems, visual docking stations, ATC radar, and other ground guidance systems), and/or the cockpit system 110B;

Hot spot location (data 520), received from the hot spot prediction system 130;

Distance to hot spot (data 530), received from the hot spot prediction system 130; and Arrival time at hot spot (data 540), received from the hot spot prediction system 130.

At step 415, using the received data, the auto brake application system 140 may determine a safe stop time to the hot spot. Throughout this disclosure, a safe stop time may mean a time within which an aircraft may come to a stop in order to safely avoid a collision at a determined hot spot. For example, at step 260, the hot spot prediction system 130 may determine a hot spot that is located 1000 meters from the current position of the aircraft, with an estimated arrival time of three minutes. In response to receiving the distance and estimated arrival time data from the hot spot prediction system 130, the auto brake application system 140 may determine that a safe stop time to the hot spot is two minutes. The value for the safe stop time may be calculated by subtracting a safe buffer time from the estimated arrival time (i.e., Safe Stop Time=Estimated Time of Arrival−Safe Buffer Time). In the current example, the safe buffer time is configured to be one minute (e.g., Safe Stop Time=3 minutes−1 minute=2 minutes). However, the safe buffer time may be configured to be a different value, which may be predefined manually by a person, or determined automatically by a system that may be configured to calculate a safe buffer time based on various data gathered from the cockpit system 110B as well as the airport system 120B. For instance, if the momentum (or speed) of the aircraft at the time of hot spot determination is high, the safe buffer time may be configured to be greater than the exemplary value of 1 minute. On the other hand, if the momentum (or speed) is low, the safe buffer time may be configured to be less than the exemplary value of 1 minute.

At step 420, the auto brake application system 140 may determine whether the aircraft can stop within the safe stop time. If it is determined that the aircraft cannot stop within the safe stop time, the method proceeds to step 425. At step 425, the auto brake application system 140 may notify ATC, other aircrafts or vehicles, and/or any other system/device or personnel that may be responsible for controlling traffic or maintaining safety of the aerodrome/airport or that may be impacted by a possible collision between the aircraft and the object at the hot spot, of a possible collision at the determined hot spot. If it is determined that the aircraft can stop within the safe stop time, the method may proceed to step 430. At step 430, the auto brake application system 140 may check whether a pilot confirmation is needed to activate the auto brake. If it is determined that a pilot confirmation is not needed, the auto brake application system 140 may proceed to step 435 and activate the auto brake. If it is determined that a pilot confirmation is needed, the auto brake application system 140 may proceed to step 440.

A default setting may require a pilot confirmation to activate the auto brake. However, the auto brake application system 140 may enable a designated airport or aircraft personnel to override the default setting (i.e., manual override) and configure the auto brake application system 140 to activate the auto brake without any pilot confirmation. In some embodiments, the auto brake application system 140 may automatically, without human intervention, override the default setting (i.e., automatic override) and activate the auto brake if it is determined that the aircraft can barely stop within the safe stop time. For instance, if it is determined that the aircraft is approaching the hot spot with such momentum (or speed) that the safe stop time barely allows the aircraft to come to a stop (e.g., within a threshold distance from the hot spot) without collision, the default seeing may be overridden to activate the auto brake immediately. However, the automatic override capability may be optional and the auto brake application system 140 may be implemented only with the default setting and/or the manual override.

Continuing with FIG. 4, at step 440, the auto brake application system 140 may determine a pilot response time limit (i.e., pilot confirmation time limit). Throughout this disclosure, a pilot response time limit may mean a time within which a pilot may confirm auto brake, in order to bring the aircraft to a safe stop without colliding with an object at the determined hot spot. The value for the pilot response time limit may be calculated by subtracting a safe buffer time from the safe stop time determined at step 415. The safe buffer time used in step 440 may be the same as or different from the safe buffer time used in step 415. The safe buffer time at step 440 may be predefined manually by a person, or determined automatically by a system that may be configured to calculate a safe buffer time based on various data gathered from the cockpit system 1108 as well as the airport system 120B. For instance, if the momentum (or speed) of the aircraft at the time of determining the pilot confirmation setting (step 240) is high, the safe buffer time may be configured to be a longer length of time. On the other hand, if the momentum (or speed) is low, the safe buffer time may be configured to be a shorter length of time.

Upon determining a pilot response time limit, the method proceeds to step 445. At step 445, the auto brake application system 140 may notify or alert the pilot to confirm auto brake. A visual notification or alert may be displayed via the cockpit system 1108. In some embodiments, other types of notification or alert may also be provided in the cockpit and/or to the crew, such as audible or haptic notification/alert. At step 450, the auto brake application system 140 may determine whether the auto brake has been confirmed by the pilot. If it is determined that the auto brake has been confirmed by the pilot, the method may proceed to step 435 and the auto brake application system 140 may activate the auto brake. If it is determined that the auto brake is not confirmed by the pilot, the method proceeds to step 455 and the auto brake application system 140 may determine whether the pilot response time is still remaining (i.e., whether the pilot is still within the time window within which the pilot may confirm the auto brake to bring the aircraft to a safe stop). At step 455, the time elapsed from the time when the pilot response time was previously determined at step 440 may be subtracted from the previously-determined pilot response time, to determine whether the pilot response time still remains. If is determined that the pilot response time still remains, the method loops back to step 445 and notifies the pilot again to confirm auto brake. The sequence of steps 445, 450 and 455 may be performed iteratively until either 1) the pilot confirms the auto brake, at which the method proceeds to step 435 or 2) there is no remaining pilot response time, at which the method proceeds to step 425. If it is determined that no pilot response time remains, the auto brake application system 140 may notify ATC, other aircrafts or vehicles, and/or any other system/device or personnel that may be responsible for controlling traffic or maintaining safety of the aerodrome/airport or that may be impacted by a possible collision between the aircraft and the object at the hot spot, of a possible collision at the determined hot spot.

Figure 6:
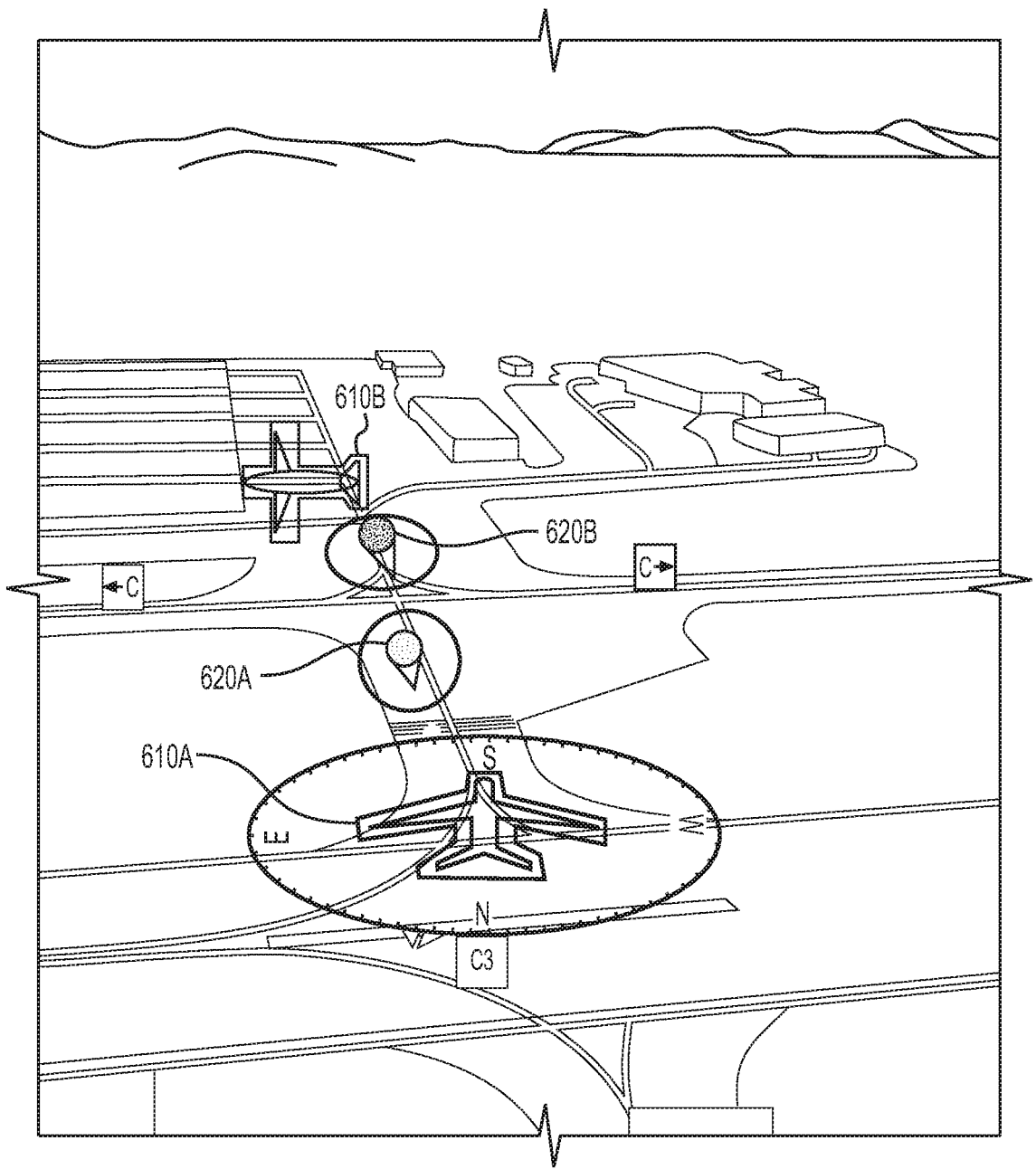
FIG. 6 illustrates an exemplary representation of detected hot spots and alerts via a display.

FIG. 6 illustrates an exemplary representation of hot spots and alerts on a display. In general, FIG. 6 depicts an aircraft 610A, hot spot 620A, hot spot 620B, and a surface object 610B presented via a display. The hot spots and alerts may be displayed via any system that is involved in the operation, management, monitoring, or control of the aircrafts (i.e., vehicles) and/or the traffic, locations or movements thereof. For example, the display may be implemented in a cockpit system 1106, electronic flight bag (EFB), mobile devices used by airport personnel and/or aircraft crew, airport guidance systems within the airport system 120B, such as advanced-surface movement guidance and control system (A-SMGCS), visual guidance system (VGS), etc. Aircraft 610A may be the aircraft being operated by the pilot. In particular, the displayed aircraft 610A may include a visual indication of the safety envelope formed around the airframe of the aircraft. Aircraft 610B may be an aircraft or a vehicle (e.g., surface object) located along the planned route of the aircraft 610A. Hot spots 620A, 620B may represent the one or more potential hot spots determined by the hot spot detection system 130. Notably, markings (i.e., cues) for the hot spots 620A and 620B may be color-coded. For instance, a green marking (not shown) may indicate that the corresponding hot spot is safe and no preventative action is necessary (e.g., hot spot(s) with a low probability of collision determined by the hot spot prediction system 130). A yellow marking (e.g., 620A) may indicate that the corresponding hot spot may pose some danger and the aircraft should approach the hot spot with caution (e.g., hot spot(s) with a moderate probability of collision determined by the hot spot prediction system 130). A red marking (e.g., 620B) may indicate that the aircraft is likely to collide with an object at the corresponding hot spot (e.g., hot spot(s) with a high possibility of collision, i.e., above a predefined threshold, determined by the hot spot prediction system 130) and a preventative action is required to avoid the collision. Further, the markings may be intuitive in that the types of the surface objects that would be potential threats for collision at the hot spots may be indicated within the markings. For instance, within the circular portion at the top of each marking (i.e., circular portions of the markings 620A, 620B), a symbol, shape, or icon that represents the type of surface object that would be a potential threat for collision at the corresponding hot spot may be included (i.e., visually displayed). For example, an aircraft symbol may represent an aircraft, a building symbol may represent a static building, a vehicle symbol may indicate a moving vehicle, and a static structure symbol may indicate a static structure installed in the airport (e.g., taxiway or runway). In FIG. 6, aircraft 610B may represent an aircraft or a vehicle that the hot spot prediction system 130 predicts to collide with the aircraft 610A at hot spot 620B. As the aircraft 610A moves in the aerodrome (e.g., taxiway, runway, etc.), only the hot spots located in the aircraft's planned route may be displayed, and the hot spots that are no longer in the aircraft's planned route (e.g., a moving vehicle that has moved out of the planned route, etc.) and/or the hot spots that are associated with a probability of collision below a certain threshold (i.e., hot spots that are considered a non-threat) may be removed from the display. In other words, the determination and display of the aircraft, surface objects, hot spot cues/marking (and the colors thereof) may be updated in real-time. In some embodiments, only the hot spots with probabilities of collision above a predefined threshold may be displayed.

Embodiments of the present disclosure concerning hot spot prediction and auto brake activation addresses the drawbacks of the prior approaches, using some of the techniques discussed above. In general, the hot spot prediction and auto brake activation system in accordance with the embodiments of the present disclosure has at least the following distinguishable features that lead to significant technical improvements:

1) provision of cost-effective vehicle collision avoidance system by utilizing existing infrastructure without deploying new/additional hardware or facilities;

2) post-detection (e.g., post-hot spot prediction) assistance via auto brake activation;

3) context-based solution to collision avoidance, without requiring optical and/or radar visibility;

4) real-time collision avoidance assistance based on vehicle's current operating state; and 5) intuitive hot spot representation via hotspot cues display and audible/haptic alerts capability.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable storage medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A computer-implemented method of predicting a hot spot, the computer-implemented method comprising:

receiving, by a hot spot prediction system comprising a first set of one or more processors and a first memory, vehicle characteristics associated with a vehicle and traffic data, wherein the traffic data comprises instructions or commands from a traffic controller;

determining, by the hot spot prediction system, a hot spot and an estimated arrival time at the hot spot based on the vehicle characteristics and further based on the instructions or commands from the traffic controller, wherein the hot spot comprises a location with a history of vehicle collision or a history of other vehicle incursions;

receiving, by an auto brake application system comprising a second set of one or more processors and a second memory, the hot spot and the estimated arrival time;

determining, by the auto brake application system, a safe stop time based on the vehicle characteristics, the hot spot and the estimated arrival time;

determining, by the auto brake application system based on a momentum or a speed of the vehicle, an actual stop time for the vehicle;

determining, by the auto brake application system, that the safe stop time is longer than the actual stop time for the vehicle;

determining, by the auto brake application system, that confirmation from the vehicle is required to perform an action;

sending, by the auto brake application system, a notification to the vehicle in response to determining that the safe stop time is longer than the actual stop time, and in response to determining that the confirmation from the vehicle is required; and performing, by the auto brake application system, the action in response to receiving the confirmation from the vehicle.

2. The computer-implemented method of claim 1, wherein the vehicle characteristics comprise vehicle momentum.

3. The computer-implemented method of claim 1, wherein determining the safe stop time comprises subtracting a safe buffer time from the estimated arrival time.

4. The computer-implemented method of claim 1, further comprising:
determining that the confirmation from the vehicle is required has not been received; and
in response to determining the confirmation from the vehicle has not been received, determining whether safe stop time is longer than the actual stop time.

5. The computer-implemented method of claim 1, further comprising defining, by the hot spot prediction system, a safety envelope around the vehicle, wherein determining the hot spot and the estimated arrival time at the hot spot comprises determining an estimated arrival time of the safety envelope at the hot spot.

6. The computer-implemented method of claim 1, further comprising:
determining a confirmation time limit within which the confirmation must be received to avoid a vehicle collision.

7. The computer-implemented method of claim 1, wherein the action comprises activating an auto brake.

8. The computer-implemented method of claim 1, wherein determining the hot spot comprises:
determining a planned route of the vehicle based at least in part on the instructions or commands from the traffic controller; and
identifying surface objects along the planned route, wherein the surface objects are at least one of static and dynamic.

9. A system for predicting a hot spot, the system comprising:
a hot spot prediction system comprising a first set of one or more processors and a first memory, wherein the first set of one or more processors are configured to:
receive vehicle characteristics associated with a vehicle and traffic data, wherein the traffic data comprises instructions or commands from a traffic controller; and
determine the hot spot and an estimated arrival time at the hot spot based on the vehicle characteristics and further based on the instructions or commands from the traffic controller, wherein the hot spot comprises a location with a history of vehicle collision or a history of other vehicle incursions; and an auto brake application system comprising a second set of one or more processors and a second memory, wherein the second set of one or more processors are configured to:
receive the hot spot and the estimated arrival time;
determine a safe stop time based on the vehicle characteristics, the hot spot and the estimated arrival time;
determine an actual stop time based on a momentum or a speed of the vehicle;
determine that the safe stop time is longer than the actual stop time;
determine that confirmation from the vehicle is required to perform an action;
send a notification to the vehicle in response to determining that the safe stop time is longer than the actual stop time and in response to determining that the confirmation from the vehicle is required; and
perform the action in response to receiving the confirmation from the vehicle.

10. The system of claim 9, wherein the first set of one or more processors of the hot spot prediction system are further configured to define a safety envelope around the vehicle, wherein determining the hot spot and the estimated arrival time at the hot spot comprises determining an estimated arrival time of the safety envelope at the hot spot.

11. The system of claim 9, wherein the action comprises activating an auto brake.

12. The system of claim 9, wherein determining the safe stop time comprises subtracting a safe buffer time from the estimated arrival time.

13. The system of claim 12, wherein the safe buffer time is calculated based on the vehicle characteristics.

14. A non-transitory computer readable medium storing instructions that, when executed by one or more processors, cause the one or more processors to perform a method of predicting a hot spot, the method comprising:
receiving, by a hot spot prediction system comprising at least one of the one or more processors and a first memory, vehicle characteristics associated with a vehicle and traffic data, wherein the traffic data comprises instructions or commands from a traffic controller;
determining, by the hot spot prediction system, a hot spot and an estimated arrival time at the hot spot based on the vehicle characteristics and further based on the instructions or commands from the traffic controller, wherein the hot spot comprises a location with a history of vehicle collision or a history of other vehicle incursions;
receiving, by an auto brake application system comprising at least one of the one or more processors and a second memory, the hot spot and the estimated arrival time;
determining, by the auto brake application system, a safe stop time based on the vehicle characteristics, the hot spot and the estimated arrival time;
determining, by the auto brake application system based on a momentum or a speed of the vehicle, an actual stop time for the vehicle;
determining, by the auto brake application system, whether the safe stop time is longer than the actual stop time for the vehicle;
determining, by the auto brake application system, that confirmation from the vehicle is required to perform an action;

sending, by the auto brake application system, a notification to the vehicle in response to determining that the safe stop time is longer than the actual stop time, and in response to determining that the confirmation from the vehicle is required; and performing, by the auto brake application system, the action in response to receiving the confirmation from the vehicle.

15. The non-transitory computer readable medium of claim 14, wherein the instructions further cause the one or more processors to perform:

defining a safety envelope around the vehicle, wherein determining the hot spot and the estimated arrival time at the hot spot comprises determining an estimated arrival time of the safety envelope at the hot spot.

16. The non-transitory computer readable medium of claim 14, wherein the vehicle characteristics comprise vehicle momentum and the traffic data.

17. The non-transitory computer readable medium of claim 16, wherein the safe buffer time is calculated based on the vehicle momentum.

18. The computer-implemented method of claim 8, further comprising:

calculating a probability that the vehicle collides with each surface object of the identified surface objects;

determining one or more hot spots having a respective probability of collision between the vehicle and one of the identified surface objects that is greater than threshold level; and determining the hot spot of the one or more hot spots that the vehicle will arrive at first based on the estimated arrival time.

19. The system of claim 9, wherein the first set of one or more processors of the hot spot prediction system are further configured to:

determine a planned route of the vehicle based at least in part on the instructions or commands from the traffic controller; and identify surface objects along the planned route, wherein the surface objects are at least one of static and dynamic;

calculate a probability that the vehicle collides with each surface object of the identified surface objects;

determine one or more hot spots having a respective probability of collision between the vehicle and one of the identified surface objects that is greater than threshold level; and determine the hot spot of the one or more hot spots that the vehicle will arrive at first based on the estimated arrival time.

20. The non-transitory computer readable medium of claim 14, wherein the instructions further cause the one or more processors to perform:

determining a planned route of the vehicle based at least in part on the instructions or commands from the traffic controller; and identifying surface objects along the planned route, wherein the surface objects are at least one of static and dynamic;

calculating a probability that the vehicle collides with each surface object of the identified surface objects;

determining one or more hot spots having a respective probability of collision between the vehicle and one of the identified surface objects that is greater than threshold level; and determining the hot spot of the one or more hot spots that the vehicle will arrive at first based on the estimated arrival time.

* * * * *